Aug. 4, 1953    J. B. DUBE    2,647,653
INSULATED CONTAINER FOR PERISHABLE SUBSTANCES
Filed Sept. 18, 1950    2 Sheets-Sheet 1

JOHN B. DUBE
INVENTOR.

BY

ATTORNEY

Aug. 4, 1953     J. B. DUBE     2,647,653
INSULATED CONTAINER FOR PERISHABLE SUBSTANCES
Filed Sept. 18, 1950     2 Sheets-Sheet 2

JOHN B. DUBE
INVENTOR.

ATTORNEY

Patented Aug. 4, 1953

2,647,653

UNITED STATES PATENT OFFICE 2,647,653

INSULATED CONTAINER FOR PERISHABLE SUBSTANCES

John B. Dube, Dallas, Tex.

Application September 18, 1950, Serial No. 185,451

1 Claim. (Cl. 220—16)

This invention relates to heat and cold insulated receptacles, especially receptacles designed for storing and shipping materials likely to be damaged by radical changes in temperature.

The principal object of the invention is to provide a heat and cold insulated receptacle for the safe storage and shipment of human blood or plasma, used in transfusions and other medicinal purposes, which must be kept at a predetermined temperature. These vital substances are required to be transported sometimes over long distances to emergency areas and, as far as is known, no provision has been hitherto made for maintaining the required predetermined temperature in shipping containers for human blood except by periodical re-icing. This method of transporting substances such as human blood, is not only time consuming and expensive but is hazardous in the sense that the blood may lose its life sustaining value or its delivery to the emergency area destination may be delayed too long.

It is therefore an important object of the invention to provide a shipping container for human blood and plasma or similar perishable substances, having side walls, bottom and removable cover composed of a material having qualities to resist radiant heat, said side walls further having a continuous void or air space separating the outer insulated walls and bottom from the insulated walls and an inner chamber, as a further heat resisting medium. Moreover, the container includes a cellular core composed preferably of pulverized perlite, suitably bonded by material having high heat resisting characteristics, the cells of the core being molded to accommodate sealed bottles especially designed to contain human blood. Provision is made, in the form of inserts to preclude undue displacement of the bottles in their respective cells as well as to accommodate, in the core, test tubes of frangible material accompanying each bottle of human blood.

Broadly, the invention seeks to provide a container suitably insulated to prevent too rapid exchange of temperature between the interior of the container and atmosphere, the container being adapted to be precooled and filled with bottles containing human blood or other substances likely to be seriously affected by other than a predetermined temperature, while the container is yet in the influence of the temperature predetermined to be the optimum for the particular substance to be stored or shipped therein so that during the period of storing and shipping, the optimum temperature will prevail within the container to preserve the said substance.

With the foregoing objects in view, the invention has further reference to certain features of accomplishment which will become apparent as the description proceeds, taken in connection with the accompanying drawings wherein.

Figure 1:
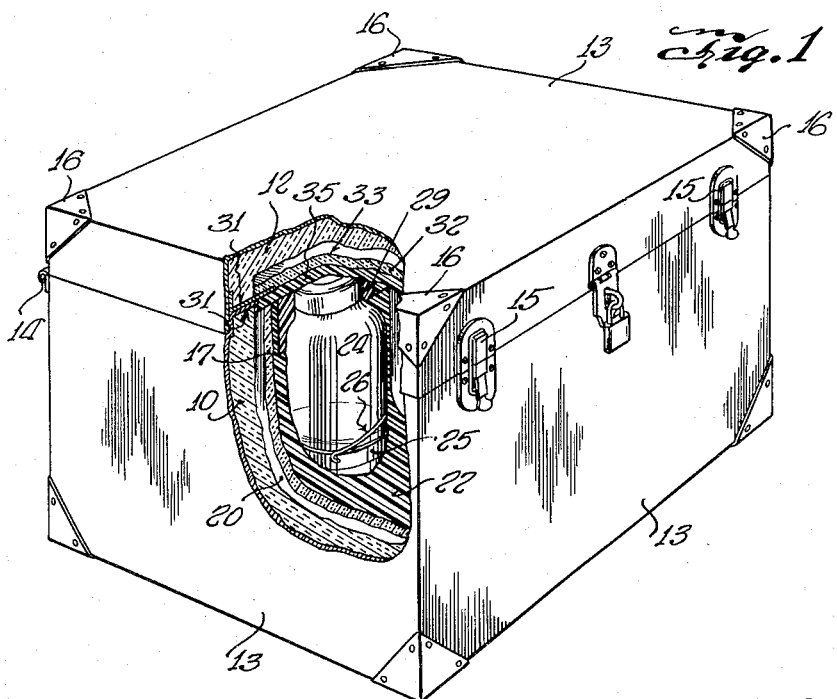
Figure 1 is a perspective view, partly broken away, illustrating an insulated storage and shipping container constructed according to the present invention.

Continuing with a more detailed description of the drawing reference numeral 10 denotes molded side walls of the container composed preferably of the well known composition of asbestos, magnesia and other fine expanded silicates, such composition having high heat resisting characteristics. Of such material is the bottom 11 and the cover 12 also constructed, the thickness of the walls, bottom and cover being determined by the uses to which the container is to be applied, that is to say, whether its contents are to survive long or short periods at a predetermined temperature. The walls and bottom of the container are sheathed in a jacket 13 of aluminum alloy, which has sufficient hardness to protect the container in shipment and also is effective as a radiant heat reflector.

While shown as rectangular in shape, the container may be obviously made in any form, including cylindrical but in any case, it is designed that the cover 12 be in positive sealing engagement with the container proper. As shown, covers provided with a hinge 14 which is coextensive with one side of the container and opposite the hinge, compression latches 15 are provided to secure the cover firmly onto the container. At each corner, there is provided a reinforcement 16.

Figure 3:
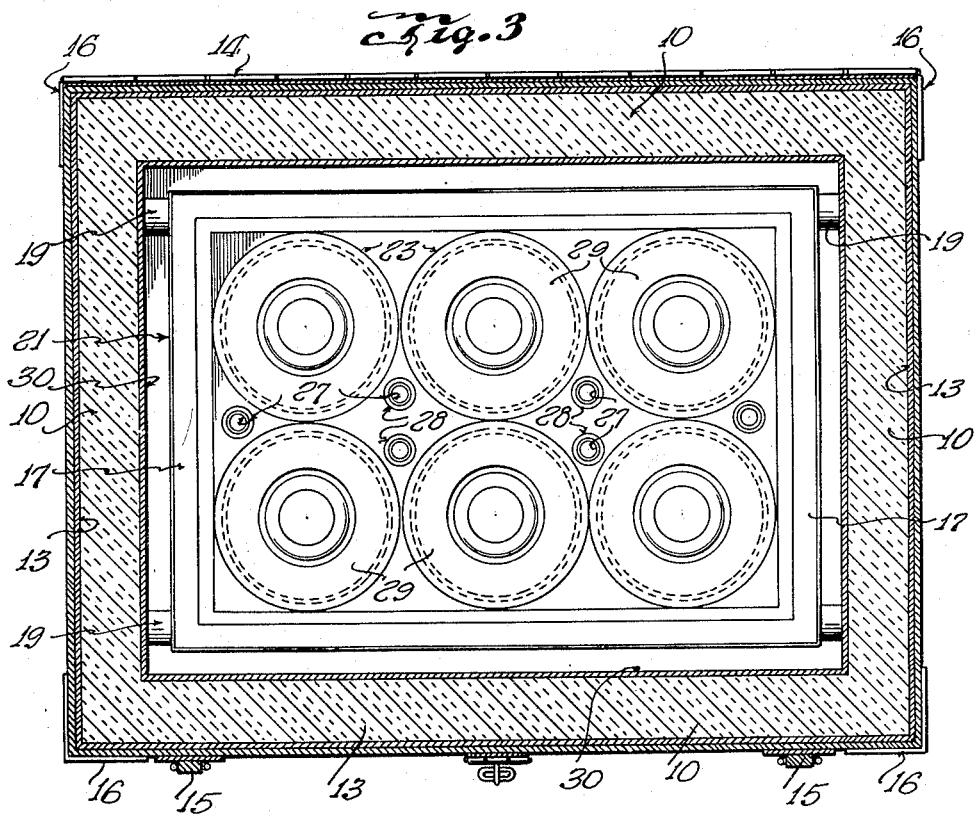
Figure 3 is a view in longitudinal section taken on line 3—3 of Figure 2.

Spaced inwardly from the inner surfaces of the walls and bottom 10 and 11 respectively are the inner walls 17 and bottom 18 of an inner chamber. Spacing members 19, composed of an insulating material similar to that of which the outer walls of the container are composed, are effective to maintain spaced relationship between the inner walls and bottom 17 and 18, respectively, and the outer walls and bottom 10 and 11 respectively, thus to define the void or air space 20 between the inner and outer sections of the container. Covering the outer surfaces of the inner walls 17 and bottom 18, or spaced outwardly therefrom, is a coating of aluminum foil 21. This aluminum foil has on one side a reflecting surface which is directed toward the void 20 and is known to have the quality to reflect radiant heat seeking to penetrate the walls of the container. The opposite surface of the aluminum foil is cemented to the outer surface of the walls and bottom 17 and 18, respectively, of the inner chamber of the container disposed in the inner chamber made up of the walls and bottom 17 and 18 respectively, is a molded core 22 preferably of pulverized perlite and alumina and silicates. The pulverized perlite may be bonded by such a bonding agent as GE 81182 silicone resin solution or other equally or more effective binding agents, known to possess high heat resisting characteristics. The core 22 is formed with a plurality of cells 23 which, in the present case are cylindrical in shape to correspond to the shape of the bottles 24, containing human blood or plasma, or other perishable substances to be shipped in the container. As a general rule, bottles 24 which are adapted to contain blood are equipped with metal bands 25 about their lower portions, to which is attached bails 26, by which the bottles are suspended in inverted position on suitable supports for purposes of transfusion. Attending each bottle is a glass test tube 27 (Fig. 3). Ordinarily, these test tubes are removably attached to the bottles 24 but for convenience, the invention provides in the core 22, a series of bores 28, equal in number to the cells 23.

Molded from the same material as the core 22 is a series of stabilizing inserts 29. The cells 23 of the core 22 are each counterbored to snugly receive the inserts 29, which latter are cylindrical in shape but are interiorly formed to conformably embrace the neck and body of the bottle 24 and the interior surfaces of the inserts may or may not be in contiguity with the bottles but in any case, they prevent longitudinal displacement of the bottles in the confines of their respective cells while lateral displacement of the bottles is prohibited by the engagement of the bails 26 with the inner wall surfaces of the cell.

Figure 2:
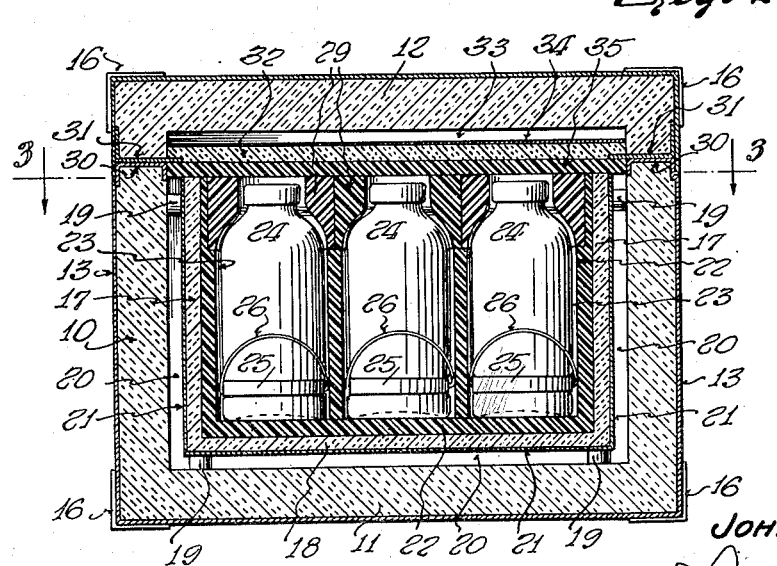
Figure 2 is a view in transverse section.

It will be observed in Figure 2 that the upper portion of the container has an edging 30 of metal or it may be desirable that this edging be of resilient material such as rubber in order that a positive seal may be effected between the cover 12 and the container. Confronting the edging 30 on the cover 12 is a corresponding edging 31, whose inner edge extends inwardly and forms a support for a sheet of insulating material 32, the latter forming the inner surfaces of the cover 12 and above which is defined a space 33, corresponding to the space 20 in the container and serves as a further medium of insulation for the interior of the container. The spaces or voids 20 and 33 may be hermetically sealed, as by silica cement so that a partial vacuum may be created therein if this is desired to insure greater resistance to heat radiation. As in the case of the inner chamber walls and bottom 17 and 18 respectively, the insulating sheet 32 in the cover has cemented thereto a sheet of aluminum foil 34 whose reflecting surface is directed toward the space or void 33, thus to repel, to a considerable degree the heat radiation which may penetrate the insulating material of the cover 12.

Figure 4:
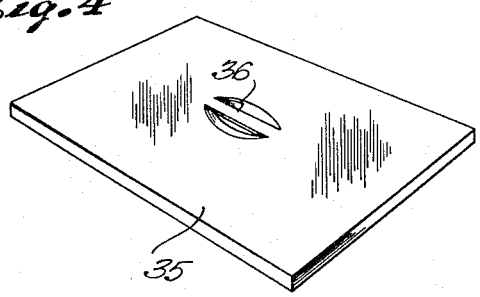
Figure 4 is a detailed perspective view of an insulated false cover for the core section of the container.
Figure 5:
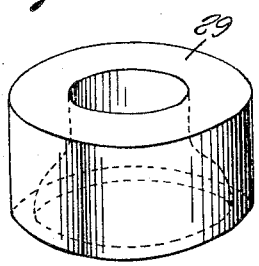
Figure 5 is a perspective view of one of the bottle stabilizing caps for preventing displacement of a bottle in its cell.

It will be noted also in Figure 1 that the tops of the inserts 29 are flush with the top of the cellular core 22, thus providing a flat surface on which is placed a false cover 35, molded or otherwise constructed from the same material as the core 22. The edges of the false cover 35 are in contiguity with the inner flange of the edging 30 surrounding the top of the cover. The false cover 35 has a finger grip 36, as seen in Figure 4, by which it may be manipulated.

Before placing the bottles 24, containing human blood or other perishable substance, in the cells 23 of the core 22, the container is allowed to remain in a refrigerated zone a sufficient period of time to allow the temperature of the container to drop to a predetermined degree, say, 40 degrees Fahrenheit, in the event the container is to be used in storing or shipping human blood. The bottles containing the blood are also precooled to like temperature and without removing the container with the bottles intact from the refrigerated zone, the cover 12 is secured in closed position. The container may then be removed from the refrigerated zone and may be stored or shipped at either high or low atmospheric temperature without materially changing the temperature within the container. Obviously, this method of shipping or storing substance likely to be affected by radical change in temperature, will avoid the necessity of either heating or cooling the contents of the container periodically, as required in the use of conventional equipment. In this manner, considerable time and expense are saved as well as insuring that the contents, in the case of human blood or plasma reach an appointed destination without deleterious effects.

Manifestly, the construction as shown and described is capable of some modification and such modification as may be construed to fall within the scope and meaning of the appended claim is also considered to be within the spirit and intent of the invention.

What is claimed is:

In a container for storing and shipping human blood, side walls and bottom defining an outer chamber, an outer sheathing of metal for said outer chamber, a heat and cold insulated cover in sealing engagement with said walls, an inner chamber having heat and cold insulated walls and spaced inwardly from the walls of said outer chamber to define a sealed void completely surrounding said inner chamber, a covering of foil on the outer surface of said inner chamber, said foil having a reflecting surface directed into said void, a cellular core within said inner chamber composed of heat and cold insulating material and defining a plurality of cells, each of said cells being adapted to receive a blood containing vessel, a false cover consisting of a sheet composed of the same material as said core and supported on top of said cellular core to seal said cells against ingress of air, and against which said cover is compressedly disposed and means for securing said cover in sealing engagement with said container to preclude exchange of temperature between the interior of said inner chamber and atmosphere.

JOHN B. DUBE.

(References on following page)

References Cited in the file of this patent

UNITED STATES PATENTS

| Number | Name | Date |
|---|---|---|
| 963,148 | Hebebrand | July 5, 1910 |
| 1,038,428 | Pederson | Sept. 10, 1912 |
| 1,260,257 | Detwiler | Mar. 19, 1918 |
| 1,369,367 | Thomson | Feb. 22, 1921 |
| 1,383,453 | Dougan | July 5, 1921 |
| 1,561,937 | Kilius | Nov. 17, 1925 |
| 1,672,904 | Randall | June 12, 1928 |
| 1,693,376 | Folger | Nov. 27, 1928 |
| 1,710,156 | Fedderson | Apr. 23, 1929 |
| 1,820,304 | Ellis | Aug. 25, 1931 |
| 2,016,675 | Hammack | Oct. 8, 1935 |
| 2,070,905 | Justheim | Feb. 16, 1937 |
| 2,123,031 | Weiner | July 5, 1938 |
| 2,431,582 | Page | Nov. 25, 1947 |
| 2,457,043 | Histand | Dec. 21, 1948 |
| 2,511,710 | Hetzler et al. | June 13, 1950 |